United States Patent
Takeda et al.

(10) Patent No.: US 11,202,263 B2
(45) Date of Patent: Dec. 14, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/612,562

(22) PCT Filed: May 12, 2017

(86) PCT No.: PCT/JP2017/018117
§ 371 (c)(1),
(2) Date: Nov. 11, 2019

(87) PCT Pub. No.: WO2018/207372
PCT Pub. Date: Nov. 15, 2018

(65) Prior Publication Data
US 2020/0169959 A1    May 28, 2020

(51) Int. Cl.
*H04W 52/14* (2009.01)
*H04W 52/04* (2009.01)
(Continued)

(52) U.S. Cl.
CPC ......... *H04W 52/146* (2013.01); *H04L 5/0048* (2013.01); *H04W 52/242* (2013.01);
(Continued)

(58) Field of Classification Search
CPC ..... H04B 17/327; H04L 5/0048; H04L 27/26; H04W 24/06; H04W 24/08; H04W 24/10;
(Continued)

(56) References Cited

U.S. PATENT DOCUMENTS

2002/0196766 A1* 12/2002 Hwang ............... H04W 52/56
                                                           370/342
2010/0285830 A1    11/2010 Englund et al.
(Continued)

FOREIGN PATENT DOCUMENTS

JP      2011-509592 A     3/2011
WO      2017/034296 A1    3/2017

OTHER PUBLICATIONS

International Search Report issued in PCT/JP2017/018117 dated Aug. 1, 2017 (2 pages).
(Continued)

*Primary Examiner* — Inder P Mehra
(74) *Attorney, Agent, or Firm* — Osha Bergman Watanabe & Burton LLP

(57) ABSTRACT

A user terminal is disclosed including a receiver, a transmitter, and a processor. The receiver receives downlink control information including a transmission power control (TPC) command. The transmitter transmits an uplink signal using a transmission power that is controlled based on an accumulated value of the TPC command, accumulated independently of a length of a transmission duration of the uplink signal. The processor resets the accumulated value if a predetermined parameter is provided by higher layer signaling. In other aspects, a radio base station and a radio communication method for a user terminal are also disclosed.

7 Claims, 12 Drawing Sheets

(51) Int. Cl.
  *H04W 52/24* (2009.01)
  *H04W 52/32* (2009.01)
  *H04W 52/54* (2009.01)
  *H04W 72/04* (2009.01)
  *H04W 52/22* (2009.01)
  *H04L 5/00* (2006.01)
  *H04L 27/26* (2006.01)

(52) U.S. Cl.
  CPC ......... *H04W 52/325* (2013.01); *H04W 52/54* (2013.01); *H04W 72/042* (2013.01); *H04W 72/0413* (2013.01)

(58) Field of Classification Search
  CPC . H04W 48/10; H04W 52/245; H04W 52/325; H04W 52/06; H04W 52/08; H04W 52/146; H04W 52/221; H04W 52/228; H04W 52/242; H04W 52/248; H04W 52/34; H04W 52/367; H04W 52/54; H04W 72/0413; H04W 72/042; H04W 72/0446; H04W 72/0473; H04W 52/12; H04W 52/30; H04W 52/44; H04W 52/56
  USPC .......................................... 455/522; 370/329
  See application file for complete search history.

(56) References Cited

U.S. PATENT DOCUMENTS

| | | | |
|---|---|---|---|
| 2012/0208589 A1* | 8/2012 | Kiyoshima | H04W 52/242 455/522 |
| 2013/0039286 A1* | 2/2013 | Larsson | H04W 52/146 370/329 |
| 2013/0194942 A1* | 8/2013 | Hu | H04W 24/02 370/252 |
| 2015/0124673 A1* | 5/2015 | Ouchi | H04W 52/362 370/311 |
| 2015/0341866 A1 | 11/2015 | Park et al. | |
| 2016/0337984 A1* | 11/2016 | Takeda | H04W 52/08 |
| 2018/0219701 A1 | 8/2018 | Seo et al. | |

OTHER PUBLICATIONS

Written Opinion of the International Searching Authority issued in PCT/JP2017/018117 dated Aug. 1, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in the counterpart Japanese Patent Application No. 2019-516870, dated Jun. 9, 2020 (8 pages).
Ericsson; "sPUSCH power control and PHR report for sTTI"; 3GPP TSG-RAN WG1 Meeting #89, R1-1708867; Hangzhou, R.R. China; May 15-19, 2017 (4 pages).
NTT Docomo, Inc.; "Uplink power control for sTTI"; 3GPP TSG RAN WG1 Meeting #89, R1-1708423; Hangzhou, P.R. China; May 15-19, 2017 (4 pages).
ZTE; "sPUSCH power control"; 3GPP TSG RAN WG1 Meeting #89, R1-1707285; Hangzhou, P.R. China; May 15-19, 2017 (3 pages).
ETSI TS 136 213 V14.2.0; "LTE; Evolved Universal Terrestrial Radio Access (E-UTRA); Physical layer procedures (3GPP TS 36.213 version 14.2.0 Release 14) Section 5.1.2.1"; Apr. 2017; (5 pages).
Office Action issued in the counterpart Japanese Patent Application No. 2019-516870, dated Oct. 6, 2020 (8 pages).
Office Action issued in Japanese Application No. 2019-516870; dated Feb. 24, 2021 (9 pages).
Extended European Search Report issued in counterpart European Patent Application No. 17909548.4, dated Nov. 25, 2020 (10 pages).
Office Action in counterpart European Patent Application No. 17 909 548.4 dated Jul. 1, 2021 (6 pages).

* cited by examiner

| CASE INDEX | ACCUMULATION OF TPC COMMANDS FOR LONG PUSCH | ACCUMULATION OF TPC COMMANDS FOR SHORT PUSCH |
|---|---|---|
| 1 | ACTIVATE | ACTIVATE |
| 2 | ACTIVATE | DE-ACTIVATE |
| 3 | DE-ACTIVATE | ACTIVATE |
| 4 | DE-ACTIVATE | DE-ACTIVATE |

FIG. 2

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE, successor systems of LTE (also referred to as, for example, LTE-Advanced (LTE-A), Future Radio Access (FRA), 4G, 5G, 5G+ (plus), New RAT (NR), and LTE Rel. 14, 15 and subsequent releases) have also been studied.

Existing LTE systems (e.g., LTE Rel. 10 and subsequent releases) have introduced Carrier Aggregation (CA) that aggregates a plurality of carriers (Component Carriers (CC)) to obtain a wider band. Each carrier is composed by a system band of LTE Rel. 8 as one unit. Furthermore, according to CA, a plurality of CCs of the same radio base station (eNB: eNodeB) are configured to a user terminal (UE: User Equipment).

Furthermore, existing LTE systems (e.g., LTE Rel. 12 and subsequent releases) have introduced Dual Connectivity (DC), too, that configures a plurality of Cell Groups (CG) of different radio base stations to user terminals. Each cell group includes at least one carrier (a CC or a cell). A plurality of carriers of the different radio base stations are aggregated. Therefore, DC is also referred to as inter-base station CA (Inter-eNB CA).

Furthermore, existing LTE systems (e.g., LTE Rel. 8 to 13) perform communication on DownLink (DL) and/or UpLink (UL) by using Transmission Time Intervals (TTI) of 1 ms. This TTI of 1 ms is a transmission time unit of one data packet subjected to channel coding, and is a processing unit of scheduling and link adaptation. The TTI of 1 ms is also referred to as a subframe or a subframe length.

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

To realize latency reduction, it is considered for future radio communication systems (e.g., LTE Rel. 14 and subsequent releases such as 5G or NR) to support a plurality of TTIs (e.g., TTIs (also referred to as a long TTI, 1 ms TTI, a substrate or a first TTI) of different time durations having a relatively long time duration and TTIs (also referred to as a short TTI, an sTTI or a second TTI) having a relatively short time duration).

Furthermore, the future radio communication systems that support a plurality of TTIs (e.g., long TTIs and short TTIs) of different time durations are assumed to dynamically switch time durations of TTIs in the same carrier (also referred to as a CC or a cell). For example, it is assumed to switch between long TTIs and short TTIs without reconfiguring Radio Resource Control (RRC) by using L1/L2 signaling (e.g., Medium Access Control (MAC) signaling and/or a physical channel).

These future radio communication systems have a risk that, when transmission power of a UL signal (e.g., at least one of a UL data channel, a UL control channel and a UL reference signal) is controlled by the same method as that of the existing LTE systems (e.g., LTE Rel. 13 and prior releases) that uses only TTIs of 1 ms, it is not possible to appropriately transmit UL signals at a plurality of TTIs.

The present invention has been made in light of such a problem. An object of the present invention is to provide a user terminal and a radio communication method that can appropriately control transmission power of UL signals at a plurality of TTIs of different time durations.

Solution to Problem

One aspect of a user terminal according to the present invention includes: a receiving section that receives a Transmission Power Control (TPC) command for a first UpLink (UL) signal transmitted at a first Transmission Time Interval (TTI) and/or a TPC command for a second UL signal transmitted at a second TTI having a shorter time duration than the first TTI; and a control section that controls accumulation of the TPC command for the first UL signal and/or the TPC command for the second UL signal.

Advantageous Effects of Invention

According to the present invention, it is possible to appropriately control transmission power of UL signals at a plurality of TTIs of different time durations.

BRIEF DESCRIPTION OF DRAWINGS

FIG. 2 is a diagram illustrating one example of accumulation control of TCP commands of a long PUSCH and TPC commands of a short PUSCH.

DESCRIPTION OF EMBODIMENTS

Figure 1A:
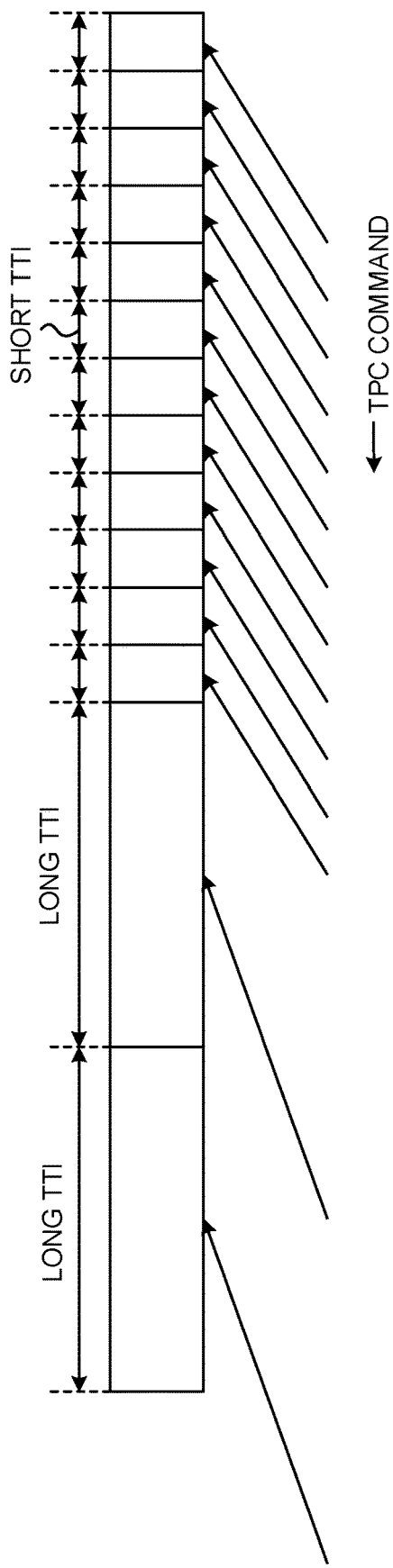
FIGS. 1A and 1B are diagrams illustrating one example of dynamic switching between short TTIs and long TTIs in the same carrier.

In existing LTE systems (e.g., LTE Rel. 8 to 13), a user terminal performs communication on DL and/or UL by using TTIs of 1 ms. The TTI of 1 ms has a time duration of 1 ms. The TTIs of 1 ms are also referred to as TTIs, subframes, general TTIs, long TTIs, general subframes or long subframes.

It is considered for future radio communication systems (e.g., LTE Rel. 14 and subsequent releases such as 5G or NR) to support a plurality of TTIs (e.g., long TTIs and short TTIs) of different time durations. The long TTI may have, for example, the same TTI length of 1 ms as those of the existing LTE systems, and include 14 symbols in a case of a general Cyclic Prefix (CP). The short TTI may have a shorter TTI length than that of the long TTI, and include two, three or seven symbols in a case of a general CP, for example.

Furthermore, the future radio communication systems are assumed to switch a plurality of TTIs (e.g., the long TTIs and the short TTIs) of different time durations in the same carrier. A plurality of TTIs are assumed to be semi-statically switched by higher layer signaling (e.g., Radio Resource Control (RRC) signaling).

Furthermore, a plurality of TTIs are assumed to be dynamically switched by L1/L2 signaling (e.g., MAC signaling and/or a physical channel (e.g., Downlink Control Information (DCI)). When L1/L2 signaling is used, a plurality of TTIs can be switched without reconfiguring RRC, and consequently can be quickly switched.

By the way, the existing LTE systems (e.g., LTE Rel. 13 and prior releases) control UL signal transmission power by using both of open loop control and closed loop control. Open loop control is control (e.g., fractional TPC that increases transmission power when path loss is less) based on path loss between a user terminal and a radio base station and target received power. Open loop control is performed based on the path loss calculated by the user terminal and a parameter notified by higher layer signaling from the radio base station.

Meanwhile, closed loop control is control for correcting a transmission power error, and is performed based on a Transmission Power Control (TPC) command notified dynamically from the radio base station. The TPC command is included in DCI.

For example, transmission power $P_{PUSCH,c}(i)$ of a UL data channel (Physical Uplink Shared Channel (PUSCH)) in a substrate #i in a cell c in the existing LTE systems (e.g., LTE Rel. 13 and prior releases) is determined according to following equation (1).

$$P_{PUSCH,c}(i) = \min\begin{cases} P_{CMAX,c}(i), \\ 10\log_{10}(M_{PUSCH,c}(i)) + P_{O\_PUSCH,c} + \\ \alpha_c \cdot PL_c + \Delta_{TF,c}(i) + f_c(i) \end{cases} \text{ [dBm]} \quad \text{Equation (1)}$$

In above equation (1), $P_{CMAX,c}(i)$ represents maximum transmission power of the user terminal. $M_{PUSCH,c}(i)$ represents a bandwidth (e.g., the number of resource blocks) for a PUSCH allocated to the user terminal in the subframe #i. Furthermore, $P_{O\_PUSCH,c}$ represents a parameter related to target received power (e.g., a parameter related to a transmission power offset, a transmission power offset P0 or a target received power parameter). $\alpha_c$ represents a weight coefficient (a coefficient configured according to path loss) of fractional TPC.

Furthermore, $PL_c$ represents path loss calculated based on received power (e.g., Reference Signal Received Power (RSRP)) of a downlink reference signal by the user terminal. $\Delta_{TF,c}(i)$ is an offset based on a modulation scheme and a coding rate (MCS: Modulation and Coding Scheme) applied to the PUSCH.

The above open loop control is performed based on $M_{PUSCH,c}(i)$, $P_{O\_PUSCH,c}$, $\alpha c$, $PLc$ and $\Delta_{TF,c}(i)$. In addition, different values are configured to $P_{O\_PUSCH,c}$ and $\alpha_c$ according to a type of a PUSCH to be scheduled (e.g., for semi-persistent scheduling, dynamic scheduling or random access response).

Furthermore, the above closed loop control is performed based on $f_c(i)$. $f_c(i)$ is a correction value of the TPC command. The correction value $f_c(i)$ may be an accumulation value obtained by accumulating increase/decrease values of transmission power indicated by TPC commands (accumulation mode) or an increase/decrease value (absolute value) of transmission power indicated by a TPC command (non-accumulation mode). Which one of the accumulation value and the absolute value is used (the accumulation mode or the non-accumulation mode) is configured to the user terminal by higher layer signaling.

In this regard, when a correction value f(i) is the accumulation value (accumulation mode), f(i) is given by, for example, following equation (2).

$$f_c(i) = f_c(i-1) + \delta_{PUSCH,c}(i-K_{PUSCH}) \quad \text{Equation (2)}$$

In equation (2), $\delta_{PUSCH,c}(i-K_{puscH})$ represents an increase/decrease value of transmission power indicated by a TPC command included in DCI of a subframe (i−KPuscH). According to equation (2), the correction value $f_c(i)$ in the subframe #i is calculated based on a correction value $f_c(i-1)$ of the subframe (i−1) and the increase/decrease value $\delta_{PUSCH,c}(i-K_{PUSCH})$ indicated by the above TPC command. Thus, the increase/decrease values of TPC commands are accumulated.

On the other hand, when the correction value $f_c(i)$ is the very increase/decrease value of transmission power indicated by a TPC command (non-accumulation mode), $f_c(i)$ is given by, for example, following equation (3).

$$f_c(i) = \delta_{PUSCH,c}(i-K_{PUSCH}) \quad \text{Equation (3)}$$

In equation (3), $\delta_{PUSCH,c}(i-K_{PUSCH})$ represents an increase/decrease value of transmission power indicated by the TPC command included in the DCI of the subframe (i−$K_{PUSCH}$). Thus, the non-accumulation mode does not take $f_c(i-1)$ into account unlike equation (2).

In addition, above $P_{CMAX,c}(i)$, $M_{PUSCH,c}(i)$, $PL_c$, $\Delta_{TF,c}(i)$, and $f_c(i)$ may be indicated simply as $P_{CMAX}$, $M_{PUSCH}$, $P_{0\_PUSCH}$, α, PL, $\Delta_{TF}$ and f, respectively, by removing subscripts of the cell c and the subframe #i.

As described above, the existing LTE systems (e.g., LTE Rel. 13 and prior releases) control transmission power of a PUSCH per subframe #i by using above equation (1) assuming that only TTIs (subframes) of 1 ms are used. Furthermore, when the accumulation mode is configured to the user terminal, TPC commands are accumulated based on the subframe #i.

On the other hand, the future radio communication systems (e.g., LTE Rel. 14 and subsequent releases such as 5G or NR) assume that a plurality of TTIs (e.g., long TTIs and short TTIs) of different time durations are dynamically switched. Hence, UL signal transmission power control that assumes only the TTIs of 1 ms are assumed not to be suitable to the future radio communication systems.

When, for example, the long TTIs and the short TTIs are dynamically switched, TPC commands are accumulated (increase/decrease values indicated by the TPC commands are accumulated) per subframe #i (TTIs of 1 ms) according to above equation (2). Therefore, there is a risk that accumulation of TPCs commands of the long TTIs and the short TTIs cannot be appropriately controlled.

Hence, the inventors of the invention have arrived at appropriately controlling UL signal transmission power at a plurality of TTIs by appropriately controlling accumulation of TPC commands at a plurality of TTIs (e.g., long TTIs and short TTIs) of different time durations.

The present embodiment will be described below. Long TTIs and short TTIs will be exemplified as a plurality of TTIs of different time durations below. However, three types or more of TTIs of different time durations may be naturally switched in the same carrier.

In addition, the number of symbols that compose the short TTI is, for example, two, four, five, six or seven, yet is not limited to this. Furthermore, a PUSCH demodulation reference signal (DMRS: Demodulation Reference Signal) may be shared between a plurality of short TTIs.

First Embodiment

The first embodiment will describe accumulation control of TPC commands of long TTIs and/or short TTIs.

Figure 1B:
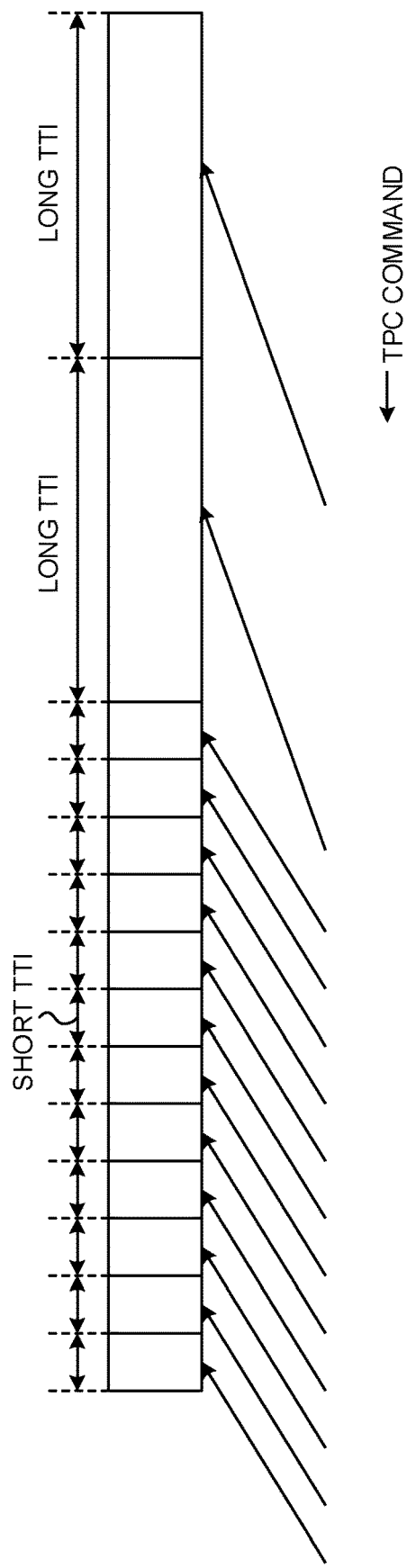

FIG. 1 is a diagram illustrating one example of dynamic switching between the short TTIs and the long TTIs in the same carrier. In FIG. 1A, the long TTIs are dynamically switched to the short TTIs in the same carrier. On the other hand, in FIG. 1B, the short TTIs are dynamically switched to the long TTIs. As illustrated in FIGS. 1A and 1B, transmission power of a PUSCH at the long TTIs and the short TTIs may be controlled based on respectively different TPC commands.

More specifically, the transmission power of the PUSCH (also referred to as a long PUSCH) at a long TTI #i may be controlled based on a TPC command for the long PUSCH (closed loop control). The TPC command for the long PUSCH may be included in DCI for scheduling the long PUSCH.

Furthermore, the transmission power of the long PUSCH may be controlled based on at least one of maximum transmission power ($P_{MAX}(i)$) of the user terminal, a bandwidth (the number of resource blocks) ($M_{PUSCH}(i)$) of the long PUSCH allocated to the user terminal at a long TTI #1, a transmission power offset P0 ($P_{0\_PUSCH}$), a weight coefficient (α) based on path loss, Path Loss (PL), an offset ($\Delta_{TF,c}(i)$) based on the MCS and a TPC command (f(i)).

For example, the transmission power of the long PUSCH may be determined by using above equation (1). In addition, a subframe #i in above equation (1) can be paraphrased as the long TTI #i. Furthermore, the time duration of the long TTI #i is not limited to 1 ms similar to the subframe #i, and only needs to be longer than the short TTI.

Furthermore, transmission power of the PUSCH (also referred to as the short PUSCH or an sPUSCH) of a short TTI #j is controlled based on the TPC command for the short PUSCH. The TPC command for the short PUSCH may be included in the DCI for scheduling the short PUSCH.

Furthermore, the transmission power of a short PUSCH #j may be controlled based on at least one of maximum transmission power ($P_{MAX}(j)$) of the user terminal, a bandwidth (the number of resource blocks) ($M_{sPUSCH}(j)$) of the short PUSCH allocated to the user terminal at the short TTI #j, the transmission power offset P0 ($P_{0\_PUSCH}$), the weight coefficient (α) based on the path loss, the Path Loss (PL), an offset ($\Delta_{TF,c}(j)$) based on the MCS and a TPC command ($f_c(j)$).

For example, the transmission power of the short PUSCH #j in the cell c may be determined by using following equation (4).

$$P_{PUSCH,c}(j) = \min\begin{cases} P_{CMAX,c}(j), \\ 10\log_{10}(M_{PUSCH,c}(j)) + P_{0\_PUSCH,c} + \\ \alpha_c \cdot PL_c + \Delta_{TF,c}(j) + f_c(j) \end{cases} \text{[dBm]} \quad \text{Equation (4)}$$

In addition, the transmission power offset P0 ($P_{0\_PUSCH}$), the weight coefficient (α) based on the path loss and a correction value ($f_c(i)$) based on the TPC command may be shared between the long TTIs and the short TTIs, or may be configured separately.

As illustrated in FIGS. 1A and 1B, when the short TTIs and the long TTIs are dynamically switched in the same carrier, accumulation of TPC commands of the long PUSCH and accumulation of TPC commands of a short PUSCH may be respectively activated or de-activated as illustrated in FIG. 2. The activation can be paraphrased as the above accumulation mode, and the de-activation can be paraphrased as the above non-accumulation mode.

<Case 1>

As described in the case 1 in FIG. 2, when both of accumulation of TPC commands of a long PUSCH and accumulation of TPC commands of a short PUSCH are activated, the user terminal may commonly accumulate (share the TPC commands) or independently accumulate (do not share the TPC commands) the TPC commands for the long PUSCH and the TPC commands for the short PUSCH.

<<Case Where TPC Commands are Commonly Accumulated>>

When the TPC commands are commonly accumulated (shared) between the long TTIs and the short TTIs, the correction value (accumulation value) $f_c(i)$ based on the TPC commands of the long TTIs and the short TTIs may be given by, for example, above equation (2). In addition, the subframe #i in above equation (2) can be paraphrased as the long TTI #i or the short TTI #i.

Figure 3A:
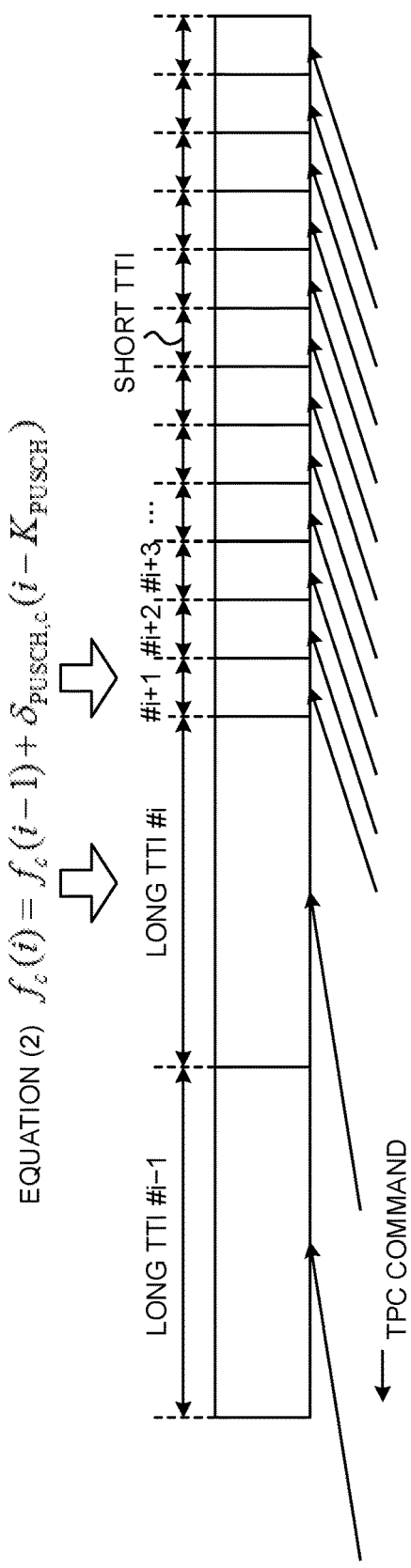
FIGS. 3A and 3B are diagrams illustrating one example of accumulation control of TPC commands according to a case 1 of a first embodiment.

FIG. 3 is a diagram illustrating one example of accumulation control of TPC commands according to the case 1 of the first embodiment. FIG. 3A illustrates that the TPC commands are shared between the long TTIs and the short TTIs. As illustrated in FIG. 3A, even when the long TTIs and the short TTIs are dynamically switched, the TPC commands of the long TTIs and the short TTIs may be commonly accumulated.

For example, in FIG. 3A, correction values (accumulation values) of the long TTI #i and a short TTI #i+1 are respectively given by above equation (2). More specifically, in FIG. 3A, a correction value $f_c(i+1)$ of the short TTI #i+1 may be obtained by adding the correction value $f_c(i)$ of the long TTI #i and the increase/decrease value indicated by the TPC command for the short PUSCH of the short TTI #i+1.

When the TPC commands are shared between the long TTIs and the short TTIs, the TPC commands of the long PUSCH and the short PUSCH are commonly accumulated, so that, even when the short TTIs and the long TTIs are dynamically switched, it is possible to easily control accumulation of the TPC commands of the long PUSCH and the short <<Case Where TPC Commands are Independently Accumulated>>

When the TPC commands are respectively accumulated independently between the long TTIs and the short TTIs, the correction value (accumulation value) $f_c(i)$ based on the TPC command of the long TTI #i may be given by, for example, above equation (2). In addition, the subframe #i in above equation (2) can be paraphrased as the long TTI #i. On the other hand, a correction value (accumulation value) $f_{c,sTTI}(j)$ based on the TPC command of the short TTI #j may be given by, for example, following equation (5).

$$f_{c,sTTI}(j)=f_{c,sTTI}(j-1)+\delta_{sPUSCH,c}(j-K_{sPUSCH}) \quad \text{Equation (5)}$$

In equation (5), $\delta_{sPUSCH,c}(j-K_{sPUSCH})$ is an increase/decrease of transmission power indicated by the TPC command for the short PUSCH of the short TTI #j. The TPC command for the short PUSCH may be included in the DCI for scheduling the short PUSCH. In equation (5), the correction value $f_{c,sTTI}(j)$ of the short TTI #j may be calculated based on a correction value $f_{c,sTTI}(j-1)$ of the short TTI #j-1 and the increase/decrease value $\delta_{sPUSCH,c}(j-K_{sPUSCH})$ indicated by the TPC command.

Figure 3B:
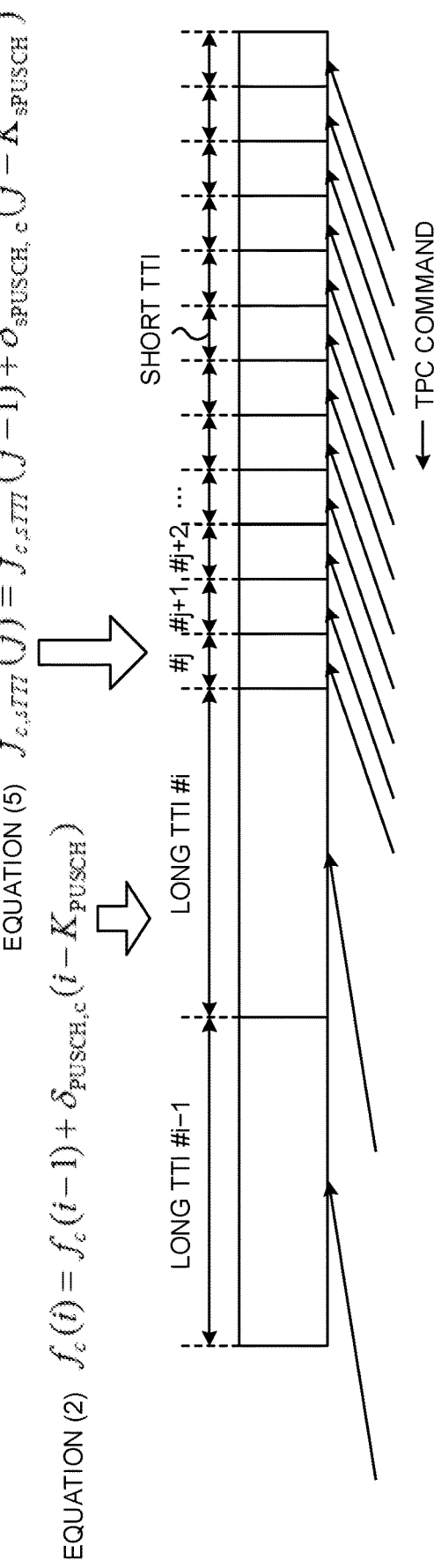

FIG. 3B illustrates that the TPC commands are independently accumulated between the long TTIs and the short TTIs. For example, in FIG. 3B, the correction value (accumulation value) $f_c(i)$ of the long TTI #i and the correction value (accumulation value) $f_{c,sTTI}sTTI(j)$ of the short TTI #j are respectively controlled independently.

As illustrated in FIG. 3B, the correction value $f_c(i)$ of the long TTI #i may be given by, for example, above equation (2). Furthermore, the correction value $f_{c,sTTI}(j)$ of the short TTI #j may be given by, for example, above equation (5). In addition, FIG. 3B does not illustrate the short TTI #j-1.

When the TPC commands are respectively accumulated independently between the long TTIs and the short TTIs, and even when the short TTIs and the long TTIs are dynamically switched, transmission power can be controlled to match the short PUSCH and the long PUSCH.

<Case 2>

As described in the case 2 in FIG. 2, when accumulation of the TPC commands of the long PUSCH is activated yet accumulation of the TPC commands of the short PUSCH is de-activated, the user terminal may accumulate the TPC commands for the long PUSCH, and may not accumulate the TPC commands for the short PUSCH.

In the case 2, the correction value (accumulation value) $f_c(i)$ based on the TPC command for the long PUSCH of the long TTI #i may be determined based on the TPC command for the short PUSCH of the short TTI #j. For example, the correction value (accumulation value) $f_c(i)$ may be given by following equation (6). In addition, in following equation (6), $f_c(i)$ may be expressed as $f_c(i, j)$.

$$f_c(i)=f_{c,sTTI}(j)+\delta_{PUSCH,c}(i-K_{PUSCH}) \quad \text{Equation (6)}$$

In equation (6), $\delta_{PUSCH,c}(i-K_{PUSCH})$ is an increase/decrease value of transmission power indicated by the TPC command for the long PUSCH of the long TTI #i. The TPC command for the long PUSCH may be included in the DCI for scheduling the long PUSCH.

In this regard, $f_{c,sTTI}(j)$ is a correction value based on the TPC command for the short PUSCH of the short TTI #j that is not yet switched to the long TTI #i (that may be a short TTI that is a predetermined number of short TTIs before switching). In the case 2, the TPC commands for the short PUSCH are not accumulated, and therefore the correction value $f_{c,sTTI}(j)$ may be given by, for example, following equation (7).

$$f_{c,sTTI}(j)=\delta_{sPUSCH,c}(j-K_{sPUSCH}) \quad \text{Equation (7)}$$

In equation (7), $\delta_{PUSCH,c}(j-K_{sPUSCH})$ is an increase/decrease value (absolute value) of transmission power indicated by the TPC command for the short PUSCH of the short TTI #j. That is, the correction value $f_{c,sTTI}(j)$ is the very increase/decrease value of transmission power indicated by the TPC command for the short PUSCH of the short TTI #j.

Alternatively, in the case 2, the correction value $f_c(i)$ based on the TPC command for the long PUSCH of the long TTI #i may be given by, for example, above equation (2). In addition, the subframe #i in above equation (2) can be paraphrased as the long TTI #i.

Figure 4:
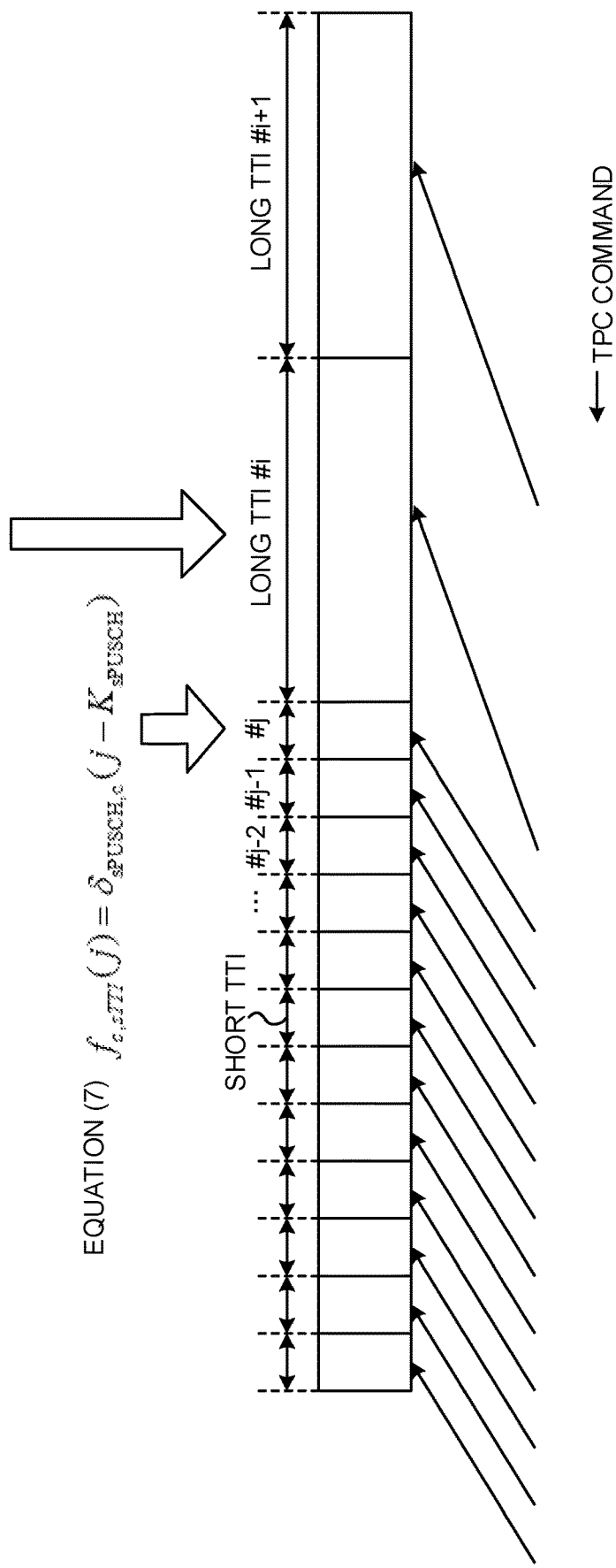
FIG. 4 is a diagram illustrating one example of accumulation control of TPC commands according to a case 2 of the first embodiment.

FIG. 4 is a diagram illustrating one example of accumulation control of TPC commands according to the case 2 of the first embodiment. As illustrated in FIG. 4, in the case 2, TPC commands for the short PUSCH are not accumulated, and therefore the correction value $f_{c,sTTI}(j)$ of the short TTI #j may be, for example, a very increase/decrease value indicated by the TPC command for the short PUSCH of the short TTI #j as indicated by above equation (7).

Furthermore, as illustrated in FIG. 4, when the short TTI #j is dynamically switched to the long TTI #i, the correction value $f_c(i)$ of the long TTI #i may be given by, for example, above equation (6) or above equation (2).

Furthermore, the correction value $f_c(i+1)$ of the long TTI #i+1 may be given by, for example, above equation (2). More specifically, the correction value $f_c(i+1)$ of the long TTI #i+1 may be obtained by adding the correction value $f_c(i)$ of the long TTI #i and the increase/decrease value indicated by the TPC command for the long PUSCH of the long TTI #i+1.

In the case 2, when the short TTI #j is dynamically switched to the long TTI #i, transmission power of the long PUSCH of the long TTI #i immediately after switching is corrected based on the TPC command of the short PUSCH of the short TTI #j before switching according to, for example, equation (6). Consequently, it is possible to appropriately control the transmission power of the long PSUCH of the long TTI #i immediately after switching.

<Case 3>

As described in the case 3 in FIG. 2, when accumulation of TPC commands of a long PUSCH is de-activated yet accumulation of TPC commands of a short PUSCH is activated, the user terminal may not accumulate the TPC commands for the long PUSCH and may accumulate the TPC commands for the short PUSCH.

In the case 3, the TPC commands for the long PUSCH are not accumulated, and therefore the correction value $f_c(i)$ based on the TPC command for the long PUSCH of the long TTI #i may be given by, for example, above equation (3). In addition, the subframe #i in above equation (3) can be paraphrased as the long TTI #i.

On the other hand, the correction value $f_{c,\,sTTI}(j)$ based on the TPC command for the short PUSCH of the short TTI #j may be determined based on the TPC command for the long PUSCH of the long TTI #i. For example, the correction value $f_{c,\,sTTI}(j)$ may be given by following equation (8). In addition, $\delta_{PUSCH,\,c}(j-K_{sPUSCH})$ of following equation (8) is as described with reference to equation (5). Furthermore, in following equation (8), $f_{c,\,sTTI}(i)$ may be expressed as $f_{c,\,sTTI}(i, j)$.

$$f_{c,sTTI}(j)=f_c(i)+\delta_{sPUSCH,c}(j-K_{sPUSCH}) \qquad \text{Equation (8)}$$

In this regard, $f_c(i)$ is a correction value based on the TPC command for the long PUSCH of the long TTI #i that is not yet switched to the short TTI #j (that may be a long TTI that is a predetermined number of long TTIs before switching). As described above, the correction value $f_c(i)$ is given by, for example, above equation (3). That is, the correction value $f_c(i)$ is the very increase/decrease value of transmission power indicated by the TPC command for the long PUSCH of the long TTI #i.

Alternatively, in the case 3, the correction value $f_{c,\,sTTI}(j)$ based on the TPC command for the short PUSCH of the short TTI #j may be given by, for example, above equation (5).

Figure 5:
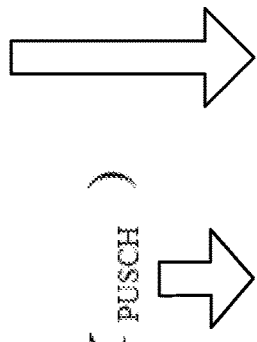
FIG. 5 is a diagram illustrating one example of accumulation control of TPC commands according to a case 3 of the first embodiment.
Figure 5:
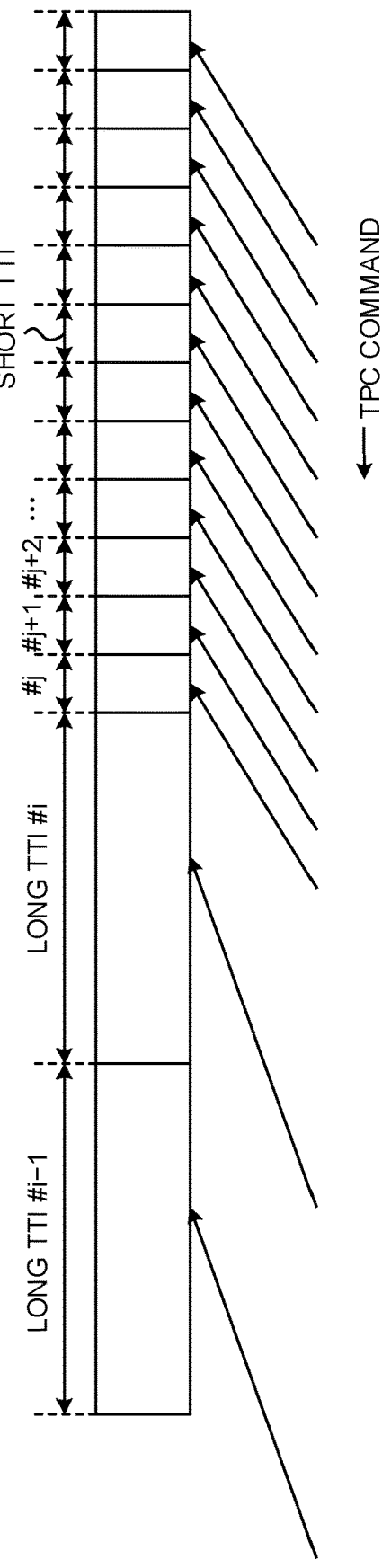

FIG. 5 is a diagram illustrating one example of accumulation control of TPC commands according to the case 3 of the first embodiment. As illustrated in FIG. 5, in the case 3, TPC commands for the long PUSCH are not accumulated, and therefore the correction value $f_c(i)$ of the long TTI #i may be the very increase/decrease value indicated by the TPC command as indicated by, for example, above equation (3).

Furthermore, as illustrated in FIG. 5, when the long TTI i is dynamically switched to the short TTI #j, the correction value $f_{c,\,sTTI}(j)$ of the short TTI #j may be given by, for example, above equation (8) or above equation (5).

Furthermore, the correction value $f_{c,\,sTTI}(j+1)$ of the short TTI #j+1 may be given by, for example, above equation (5). More specifically, the correction value $f_{c,\,sTTI}(j+1)$ of the short TTI #j+1 may be obtained by adding the correction value $f_{c,\,sTTI}(j)$ of the short TTI #j and the increase/decrease value indicated by the TPC command for the short PUSCH of the short TTI #j+1.

In the case 3, when the long TTI #i is dynamically switched to the short TTI #j, transmission power of the short PUSCH of the short TTI #j immediately after switching is corrected based on the TPC command of the long PUSCH of the long TTI #i before switching according to, for example, equation (8). Consequently, it is possible to appropriately control the transmission power of the short PUSCH of the short TTI #j immediately after switching.

<Case 4>

As described in the case 4 in FIG. 2, when both of accumulation of TPC commands of a long PUSCH and accumulation of TPC commands of a short PUSCH are deactivated, the user terminal may not respectively accumulate the TPC commands for the long PUSCH and the TPC commands for the short PUSCH.

In the case 4, the correction value $f_c(i)$ based on the TPC command of the long TTI #i may be given by, for example, above equation (3). In addition, the subframe #i in above equation (3) can be paraphrased as the long TTI #i. Furthermore, the correction value $f_{c,\,sTTI}(j)$ based on the TPC command of the short TTI #j may be given by, for example, above equation (7).

Figure 6:
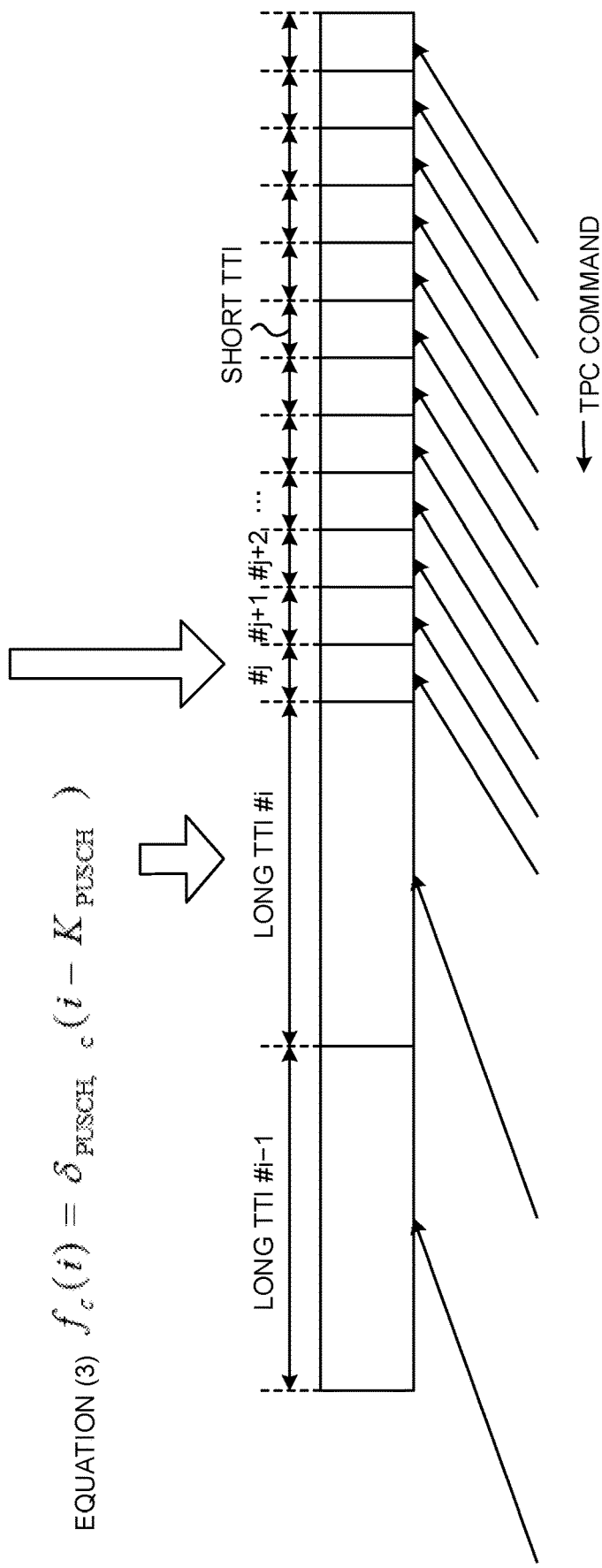
FIG. 6 is a diagram illustrating one example of accumulation control of TPC commands according to a case 4 of the first embodiment.

FIG. 6 is a diagram illustrating one example of accumulation control of TPC commands according to the case 4 of the first embodiment. As illustrated in FIG. 6, in the case 4, the correction value $f_c(i)$ of the long TTI #i may be an increase/decrease value (absolute value) indicated by the TPC command for the long PUSCH of the long TTI #i. For example, the correction value $f_c(i)$ may be given by above equation (3).

Furthermore, the correction value $f_{c,\,sTTI}(j)$ of the short TTI #j may be the increase/decrease value (absolute value) indicated by the TPC commands for the short PUSCH of the short TTI #j. For example, the correction value $f_{c,\,sTTI}(j)$ may be given by above equation (7).

In addition, FIG. 6 illustrates different equations between long TTIs and short TTIs. However, the same equation (e.g., equation (3)) may be shared between the long TTIs and the short TTIs.

In the case 4, the TPC commands for the short PUSCH and the TPC commands for the long PUSCH are not accumulated, so that, even when the short TTIs and the long TTIs are dynamically switched, it is possible to appropriately control respective transmission power of the short PUSCH and the long PUSCH.

As described above, according to the first embodiment, accumulation of the TPC commands of the respective long TTIs and short TTIs is controlled, so that, even when the short TTIs and the long TTIs are dynamically switched, it is possible to appropriately control respective transmission power of the short PUSCH and the long PUSCH.

Second Embodiment

The second embodiment will describe reset control of accumulation of TPC commands of long TTIs and/or short TTIs. A user terminal may control resetting of an accumulation value of TPC commands based on at least one of following points. In addition, when the accumulation value is reset, the accumulation value is configured to an initial value (e.g., 0).

Whether or not a parameter (e.g., an above transmission power offset P0 and/or a weight coefficient α) for open loop control is shared between a long PUSCH and a short PUSCH Whether or not an accumulation value ($f_c(i)$) of TPC commands is shared Whether or not the parameter for the above open loop control is changed by a higher layer (1) Case Where Parameter for Open Loop Control is Shared When the parameter (e.g., the above transmission power offset P0 and/or weight coefficient α) for open loop control is shared between the long PUSCH and the short PUSCH, the user terminal may control resetting of the accumulation value of the TPC commands based on whether or not the accumulation value ($f_c(i)$) of the TPC commands is shared between the long PUSCH and the short PUSCH (whether or not TPC commands for the long PUSCH and TPC commands for the short PUSCH are respectively accumulated independently) (following (1-1) or (1-2)).

(1-1) Case Where Accumulation Value of TPC Commands is Shared

When the accumulation value ($f_c(i)$) of the TPC commands is shared between the long PUSCH and the short PUSCH, and when the parameter for open loop control that is common between the long PUSCH and the short PUSCH is changed by the higher layer, the user terminal may reset the accumulation value ($f_c(i)$). When, for example, the transmission power offset P0 that is common between the long PUSCH and the short PUSCH is changed by the higher layer, the user terminal may reset the accumulation value ($f_c(i)$).

(1-2) Case Where Accumulation Value of TPC Commands is Shared

When the TPC commands for the long PUSCH and the TPC commands for the short PUSCH are respectively accumulated independently, and when the parameter for open loop control that is common between the long PUSCH and the short PUSCH is changed by the higher layer, the user terminal may reset the accumulation value ($f_c(i)$) of the TPC commands for the long PUSCH, and may not reset an accumulation value ($f_{c,\ sTTI}(j)$) of TPC commands for the short PUSCH.

When, for example, the transmission power offset P0 that is common between the long PUSCH and the short PUSCH is changed by the higher layer, the user terminal may reset the accumulation value ($f_c(i)$) of the TPC commands for the long PUSCH, and may not reset the accumulation value ($f_{c,\ sTTI}(j)$) of the TPC commands for the short PUSCH.

Alternatively, when the accumulation value of the TPC commands are independently accumulated between the long PUSCH and the short PUSCH, and the parameter for open loop control that is common between the long PUSCH and the short PUSCH is changed by the higher layer, the user terminal may reset the accumulation value ($f_c(i)$) of the TPC commands for the long PUSCH, and may reset the accumulation value ($f_{c,\ sTTI}(j)$) of the TPC commands for the short PUSCH, too.

When, for example, the transmission power offset P0 that is common between the long PUSCH and the short PUSCH is changed by the higher layer, the user terminal may reset the accumulation value ($f_c(i)$) of the TPC commands for the long PUSCH, and may reset the accumulation value ($f_{c,\ sTTI}(j)$) of the TPC commands for the short PUSCH.

(2) Case Where Parameter for Open Loop Control is Not Shared

When the parameter (e.g., the above transmission power offset P0 and/or weight coefficient α) for open loop control is not shared (is respectively configured independently) between the long PUSCH and the short PUSCH, the user terminal may control resetting of the accumulation value of the TPC commands based on whether or not the accumulation value ($f_c(i)$) of the TPC commands is shared between the long PUSCH and the short PUSCH (whether or not the TPC commands for the long PUSCH and the TPC commands for the short PUSCH are respectively accumulated independently) (following (2-1) or (2-2)).

(2-1) Case Where Accumulation Value of TPC Commands is Shared

When the accumulation value ($f_c(i)$) of the TPC commands is shared between the long PUSCH and the short PUSCH, and when the parameter for open loop control of the long PUSCH is changed by the higher layer, the user terminal may reset the accumulation value ($f_c(i)$). When, for example, the transmission power offset P0 of the long PUSCH is changed by the higher layer, the user terminal may reset the accumulation value ($f_c(i)$).

Alternatively, when the accumulation value ($f_c(i)$) of the TPC commands is shared between the long PUSCH and the short PUSCH, and when the parameter for open loop control of the short PUSCH is changed by the higher layer, the user terminal may reset the accumulation value ($f_c(i)$). When, for example, the transmission power offset P0 of the short PUSCH is changed by the higher layer, the user terminal may reset the accumulation value ($f_c(i)$).

(2-2) Case Where Accumulation Value of TPC Commands is not Shared

When the TPC commands for the long PUSCH and the TPC commands for the short PUSCH are respectively accumulated independently, and when the parameter for open loop control of the long PUSCH is changed by the higher layer, the user terminal may reset the accumulation value ($f_c(i)$) of the TPC commands for the long PUSCH. When, for example, the transmission power offset P0 of the long PUSCH is changed by the higher layer, the user terminal may reset the accumulation value ($f_c(i)$) for the long PUSCH.

Furthermore, when the TPC commands for the long PUSCH and the TPC commands for the short PUSCH are respectively accumulated independently, and when the parameter for open loop control of the short PUSCH is changed by the higher layer, the user terminal may reset the accumulation value ($f_{c,\ sTTI}(j)$) of the TPC commands for the short PUSCH. When, for example, the transmission power offset P0 of the short PUSCH is changed by the higher layer, the user terminal may reset the accumulation value ($f_{c,\ sTTI}(j)$) for the short PUSCH.

Furthermore, when the TPC commands for the long PUSCH and the TPC commands for the short PUSCH are respectively accumulated independently, and when the parameter for open loop control of the long PUSCH is changed by the higher layer, the user terminal may reset both of the accumulation value ($f_c(i)$) of the TPC commands for the long PUSCH and the accumulation value ($f_{c,\ sTTI}(j)$) of the TPC commands for the short PUSCH. When, for example, the transmission power offset P0 of the long PUSCH is changed by the higher layer, the user terminal may reset both of the accumulation value ($f_c(i)$) for the long PUCCH and the accumulation value ($f_{c,\ sTTI}(j)$) for the short PUSCH.

Furthermore, when the TPC commands for the long PUSCH and the TPC commands for the short PUSCH are respectively accumulated independently, and when the parameter for open loop control of the short PUSCH is changed by the higher layer, the user terminal may reset both of the accumulation value ($f_c(i)$) of the TPC commands for the long PUSCH and the accumulation value ($f_{c,\ sTTI}(j)$) of the TPC commands for the short PUSCH. When, for example, the transmission power offset P0 of the short PUSCH is changed by the higher layer, the user terminal may reset both of the accumulation value ($f_c(i)$) for the long PUSCCH and the accumulation value ($f_{c,\ sTTI}(j)$) for the short PUSCH.

According to the second embodiment, the accumulation values of the TPC commands of the long PUSCH and/or the short PUSCH are reset based on the above conditions, so that, even when the short TTIs and the long TTIs are dynamically switched, it is possible to appropriately control respective transmission power of the short PUSCH and the long PUSCH.

Other Embodiments

Accumulation control of TPC commands described in the above first embodiment and/or reset control of an accumulation value of TPC commands described in the second embodiment are applicable not only to a long PUSCH and a short PUSCH but also to a UL signal transmitted at long TTIs and short TTIs.

For example, the accumulation control according to the first embodiment and/or reset control according to the second embodiment are applicable to the PUCCH (also referred to as a long PUCCH) transmitted at the long TTIs and a PUSCCH (also referred to as a short PUCCH or an sPUCCH) transmitted at short TTIs.

Furthermore, the accumulation control according to the first embodiment and/or the reset control according to the second embodiment are applicable to a Sounding Reference Signal (SRS), too, transmitted at long TTIs and an SRS transmitted at short TTIs. In addition, transmission power of the SRS at the long TTIs and the short TTIs may be obtained by applying a predetermined offset to transmission power of the long PUSCH and the short PUSCH described in the first embodiment.

(Radio Communication System)

The configuration of the radio communication system according to the present embodiment will be described below. The radio communication method according to each of the above embodiments is applied to this radio communication system. In addition, the radio communication method according to each of the above embodiments may be applied alone or may be applied in combination.

Figure 7:
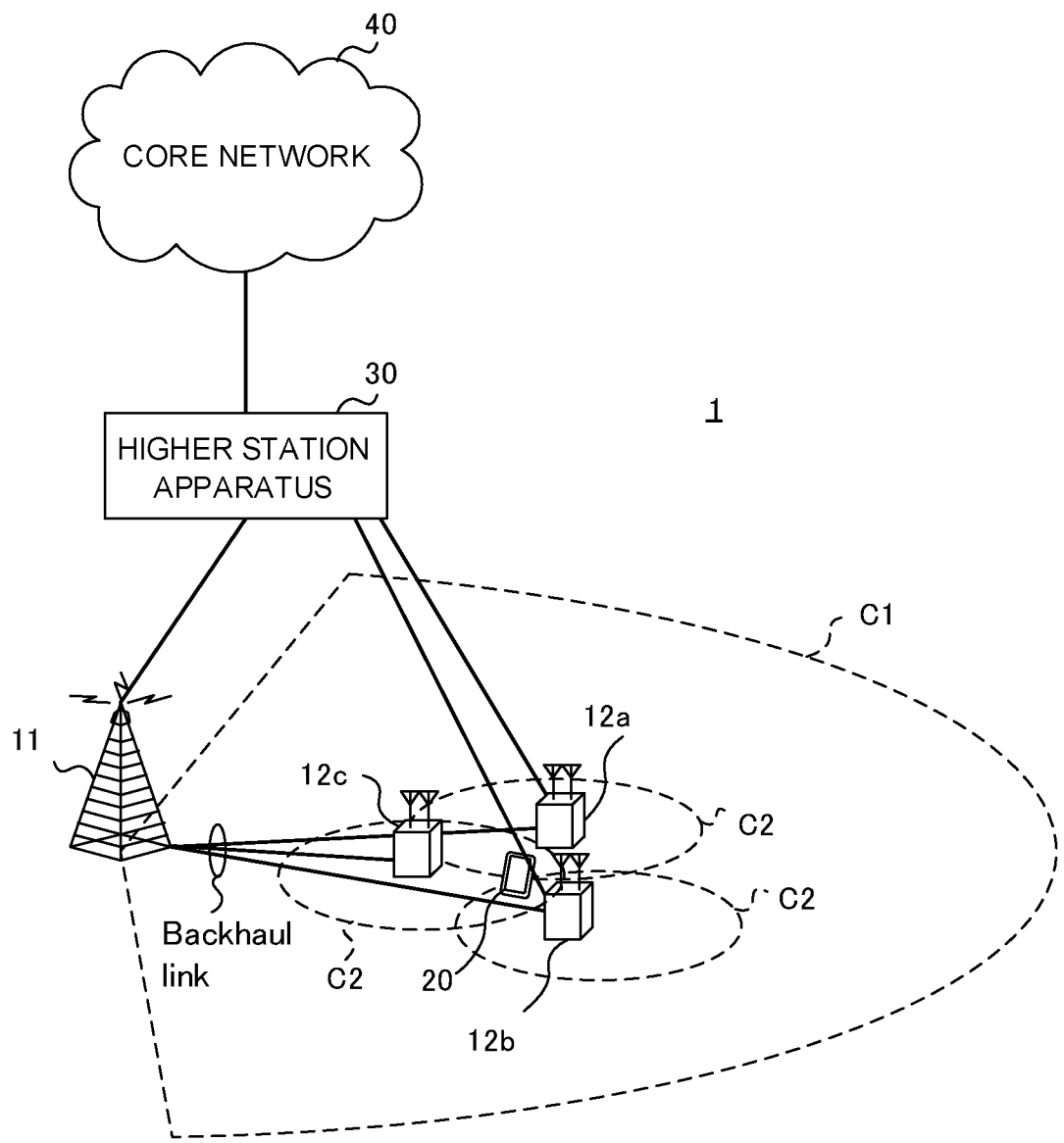
FIG. 7 is a diagram illustrating one example of a schematic configuration of a radio communication system according to the present embodiment.

FIG. 7 is a diagram illustrating one example of a schematic configuration of the radio communication system according to the present embodiment. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC). In this regard, the radio communication system 1 may be referred to as SUPER 3G, LTE-Advanced (LTE-A), IMT-Advanced, 4G, 5G, Future Radio Access (FRA) and New RAT (NR).

The radio communication system 1 illustrated in FIG. 7 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. A different numerology may be configured to be applied between cells. In this regard, the numerology refers to a communication parameter set that characterizes a signal design of a certain RAT and/or a RAT design, and is at least one of a subcarrier interval, a symbol length or a CP length, for example.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can perform communication in each cell by using Time Division Duplex (TDD) or Frequency Division Duplex (FDD). TDD cells and FDD cells may be referred to as TDD carriers (frame configuration type 2) and FDD carriers (frame configuration type 1), respectively.

Furthermore, each cell (carrier) may be applied one of a substrate (a TTI, a general TTI, a long TTI, a general substrate, a long subframe or a slot) having a relatively long time duration (e.g., 1 ms) and a substrate (a short TTI, a short subframe or a slot) having a relatively short time duration, or both of the long subframe and the short subframe. Furthermore, each cell may be applied subframes of two or more time durations.

The user terminal 20 and the radio base station 11 can communicate by using a carrier (an existing carrier that is also referred to as a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz, 5 GHz or 30 to 70 GHz) or may use the same carrier as that used by the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device-to-Device communication (D2D) with the other user terminals 20.

The radio communication system 1 can apply Orthogonal Frequency-Division Multiple Access (OFDMA) to Down-Link (DL) and can apply Single Carrier Frequency Division Multiple Access (SC-FDMA) to UpLink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use different bands to reduce an interference between the terminals. In this regard, uplink and downlink radio access schemes are not limited to a combination of these and OFDMA may be used for UL. Furthermore, SC-FDMA is applicable to Side-Link (SL) used for device-to-device communication.

The radio communication system 1 uses as DL channels a DL data channel (PDSCH: Physical Downlink Shared Channel that is also referred to as a DL shared channel) shared by each user terminal 20, a broadcast channel (PBCH: Physical Broadcast Channel) and an L1/L2 control channel. User data, higher layer control information and System Information Blocks (SIB) are transmitted on the PDSCH. Furthermore, Master Information Blocks (MIB) are transmitted on the PBCH.

The L1/L2 control channel includes a DL control channel (e.g., a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH and/or the EPDCCH. The number of OFDM symbols used for the PDCCH is transmitted on the PCFICH. The EPDCCH is subjected to frequency division multiplexing with the PDSCH and is used to transmit DCI similar to the PDCCH. Transmission acknowledgement information (A/N or HARQ-ACK) of the PUSCH can be transmitted on at least one of the PHICH, the PDCCH or the EPDCCH.

The radio communication system 1 uses as UL channels a UL data channel (PUSCH: Physical Uplink Shared Channel that is also referred to as a UL shared channel) shared by each user terminal 20, a UL control channel (PUCCH: Physical Uplink Control Channel), and a random access channel (PRACH: Physical Random Access Channel). User data and higher layer control information are transmitted on the PUSCH. Uplink Control Information (UCI) including at least one of transmission acknowledgement information (A/N or HARQ-ACK) of the PDSCH and Channel State Information (CSI) is transmitted on the PUSCH or the PUCCH. A random access preamble for establishing connection with cells can be transmitted on the PRACH.

<Radio Base Station>

Figure 8:
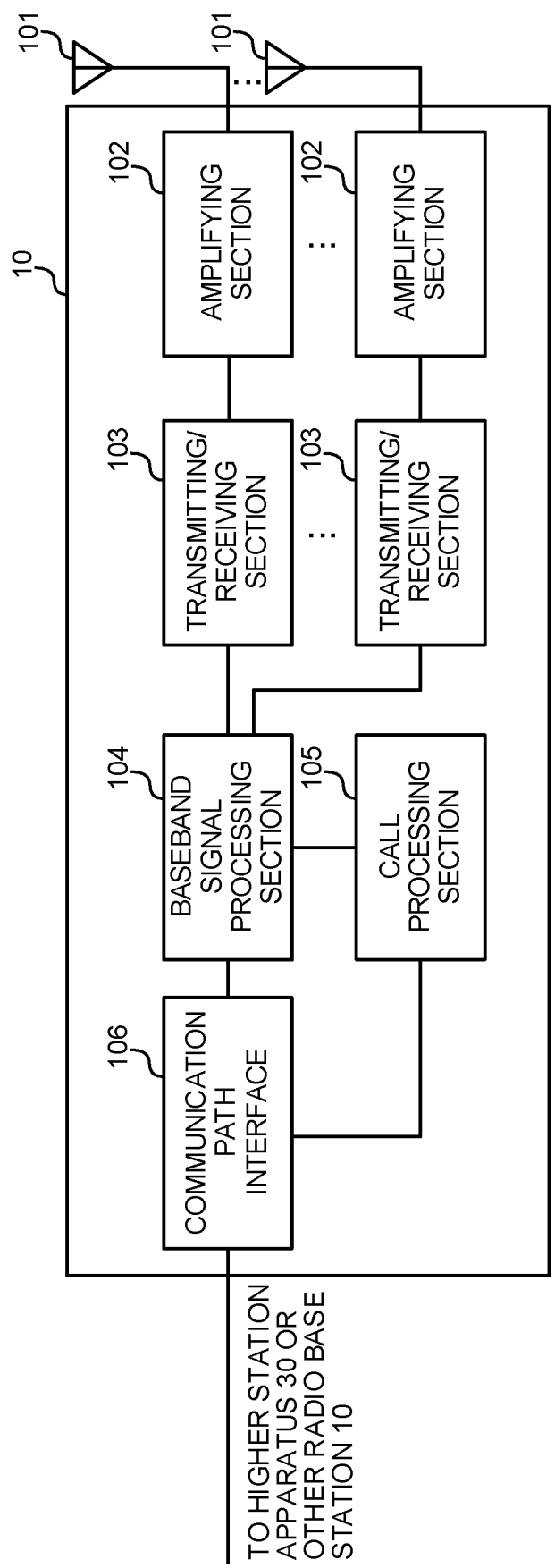
FIG. 8 is a diagram illustrating one example of an entire configuration of a radio base station according to the present embodiment.

FIG. 8 is a diagram illustrating one example of an entire configuration of the radio base station according to the present embodiment. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 may be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as processing of Hybrid Automatic Repeat reQuest (HARQ)), and transmission processing such as at least one of scheduling, transmission format selection, channel coding, rate matching, scrambling, Inverse Fast Fourier Transform (IFFT) processing, and precoding processing on the user data to transfer to each transmitting/receiving section 103. Furthermore, the baseband signal processing section 104 performs transmission processing such as channel coding and/or inverse fast Fourier transform on a downlink control signal, too, to transfer to each transmitting/receiving section 103.

Each transmitting/receiving section 103 converts a baseband signal precoded and output per antenna from the baseband signal processing section 104 into a radio frequency band to transmit. The radio frequency signal subjected to frequency conversion by each transmitting/receiving section 103 is amplified by each amplifying section 102, and is transmitted from each transmission/reception antenna 101.

The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal as a UL signal received by each transmission/reception antenna 101. Each transmitting/receiving section 103 receives the UL signal amplified by each amplifying section 102. Each transmitting/receiving section 103 performs frequency conversion on the received signal into a baseband signal to output to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal to transfer to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmitting/receiving section 103 transmits a DL signal (e.g., at least one of DCI (a DL assignment and/or a UL grant), DL data (DL data channel) and a DL reference signal), and receives a UL signal (e.g., at least one of UL data (UL data channel), UCI and a UL reference signal).

Furthermore, each transmitting/receiving section 103 receives a UL signal (e.g., at least one of a long PUSCH, a short PUSCH, a long PUCCH, a short PUCCH and an SRS) at a plurality of TTIs (e.g., long TTIs (first TTIs) and short TTIs (second TTIs)) of different time durations.

Furthermore, each transmitting/receiving section 103 transmits a parameter used to control transmission power of the above UL signal. For example, each transmitting/receiving section 103 may transmit a parameter for open loop control by higher layer signaling. Furthermore, each transmitting/receiving section 103 may transmit DCI including a TPC command.

Figure 9:
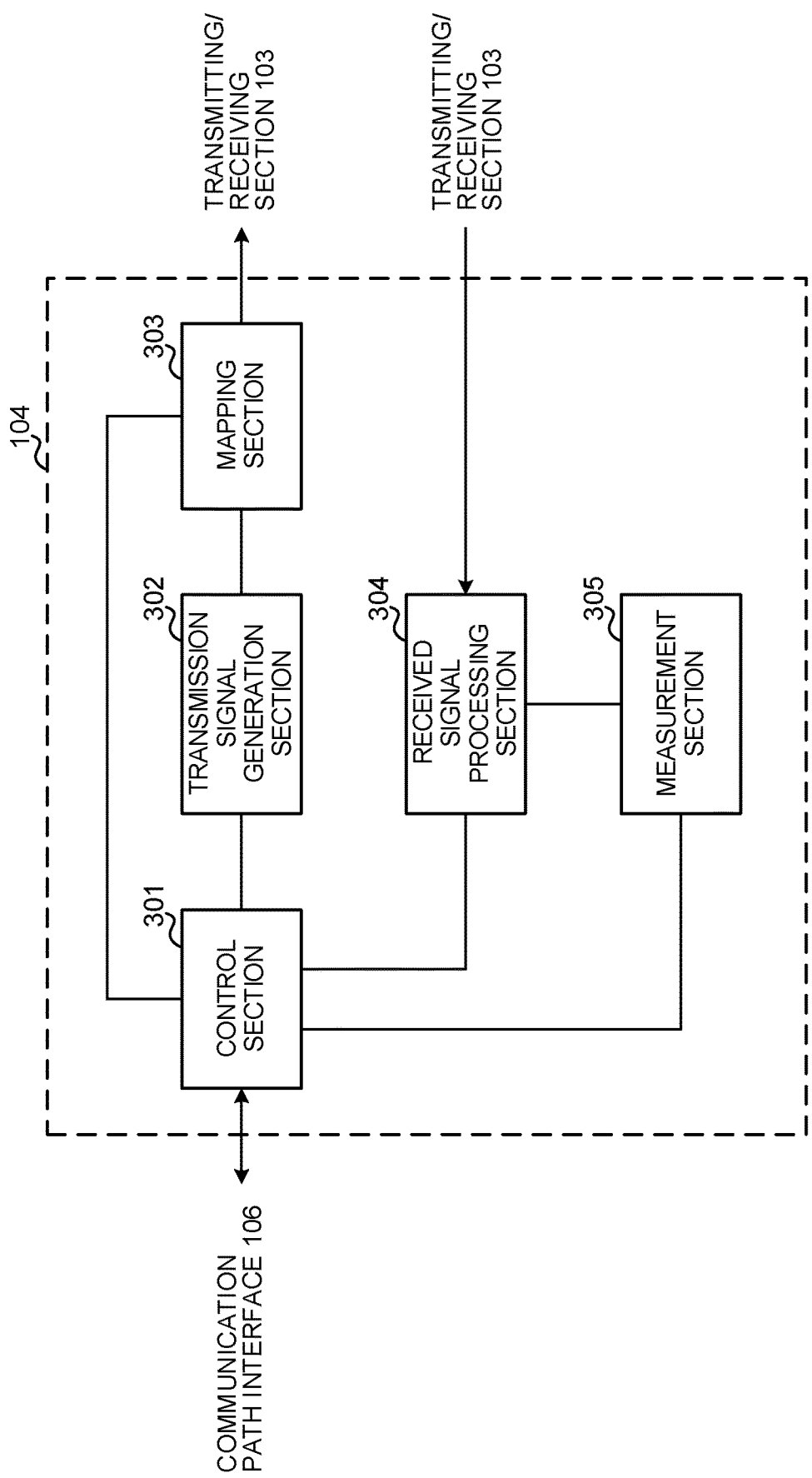
FIG. 9 is a diagram illustrating one example of a function configuration of the radio base station according to the present embodiment.

FIG. 9 is a diagram illustrating one example of a function configuration of the radio base station according to the present embodiment. In addition, FIG. 9 mainly illustrates function blocks of characteristic portions according to the present embodiment, and assumes that the radio base station 10 includes other function blocks that are necessary for radio communication, too. As illustrated in FIG. 9, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304 and measurement of the measurement section 305.

More specifically, the control section 301 schedules the user terminal 20. More specifically, the control section 301 may perform scheduling and/or retransmission control on DL data and/or UL data channels based on UCI from the user terminal 20.

Furthermore, the control section 301 controls Transmission Time Intervals (TTI) used to receive a DL signal and/or transmit a UL signal. The control section 301 controls switching between a plurality of TTIs (e.g., long TTIs and short TTIs) of different time durations. The control section 301 may instruct the user terminal 20 to switch between a plurality of TTIs by higher layer signaling and/or L1/L2 signaling.

Furthermore, the control section 301 controls generation and/or transmission of a parameter used to control transmission power of the UL signal. More specifically, the control section 301 may control generation and/or transmission of the parameter for open loop control that is common or independent between a plurality of TTIs of different time durations. The parameter for open loop control may be at least one of maximum transmission power ($P_{MAX}(i)$) of the user terminal, a bandwidth (the number of resource blocks) ($M_{PUSCH}(i)$) of a long PUSCH allocated to the user terminal at a long TTI #i, the transmission power offset P0 ($P_{0\_PUSCH}$), the weight coefficient ($\alpha$) based on path loss, Path Loss (PL), and an offset ($\Delta_{TF,\,c}(i)$) based on an MCS.

Furthermore, the control section 301 may control generation and/or transmission of a parameter (e.g., TPC command) for closed loop control. The control section 301 may control generation and/or transmission of a TPC command (e.g., a TPC command for the long PUSCH and a TPC command for a short PUSCH) that is independent between a plurality of TTIs of different time durations.

Furthermore, the control section 301 may instruct the user terminal to activate or de-activate accumulation of TPC commands.

The control section 301 can be composed of a controller, a control circuit or a control apparatus described based on the common knowledge in the technical field according to the present invention.

The transmission signal generating section 302 generates DL signals (such as a DL data signal, a DL control signal and a DL reference signal) based on an instruction from the control section 301 to output to the mapping section 303.

The transmission signal generating section 302 can be composed of a signal generator, a signal generating circuit and a signal generating apparatus described based on the common knowledge in the technical field according to the present invention.

The mapping section 303 maps the DL signal generated by the transmission signal generating section 302, on a predetermined radio resource based on the instruction from the control section 301 to output to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. Furthermore, the received signal processing section 304 may output the received signal and/or the signal after the reception processing to the measurement section 305. Furthermore, the received signal processing section 304 performs reception processing of the UCI based on a UL control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of the UL reference signal. The measurement section 305 may output a measurement result to the control section 301.

<User Terminal>

Figure 10:
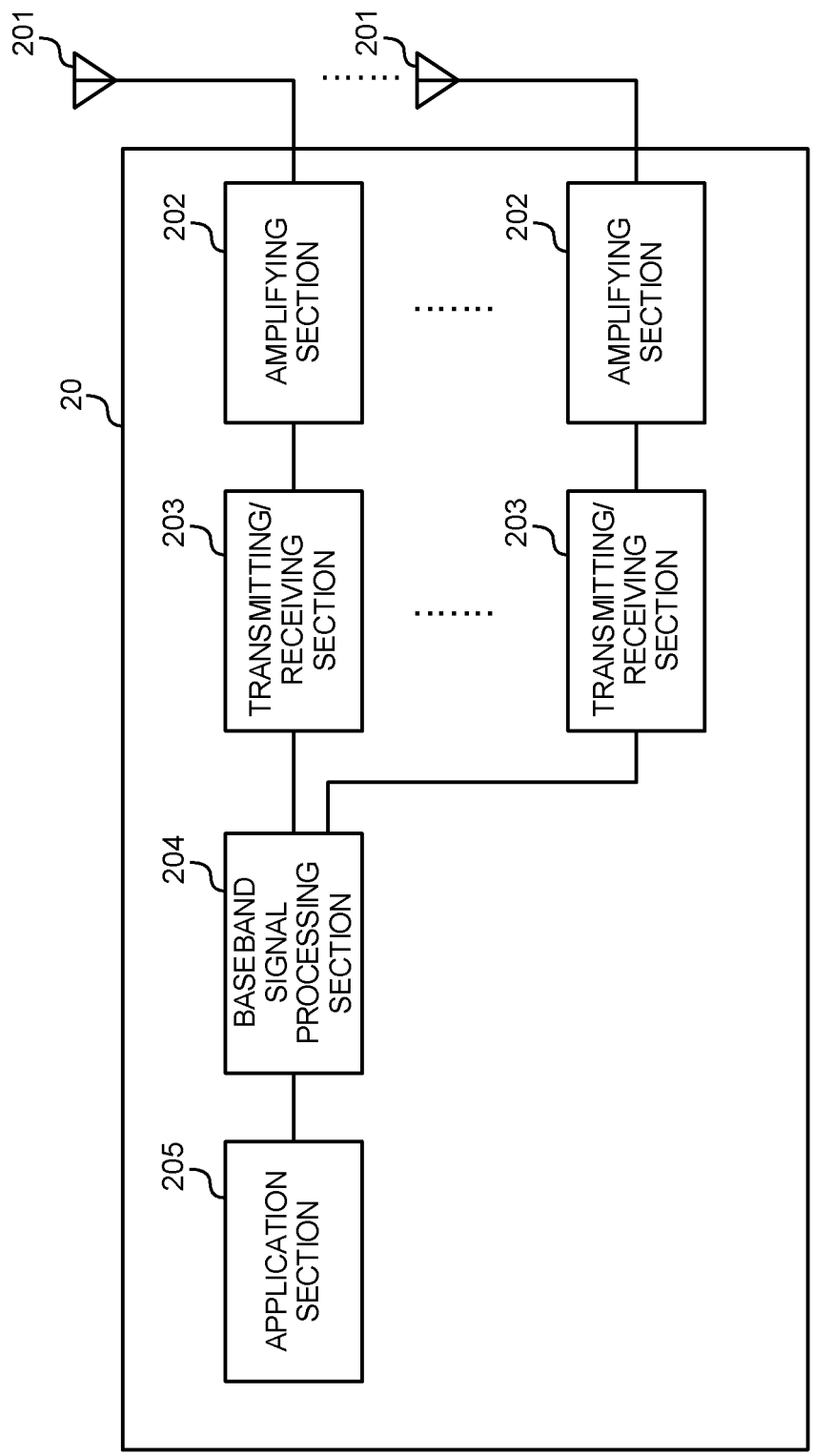
FIG. 10 is a diagram illustrating one example of an entire configuration of a user terminal according to the present embodiment.

FIG. 10 is a diagram illustrating one example of an entire configuration of the user terminal according to the present embodiment. The user terminal 20 includes pluralities of transmission/reception antennas 201 for MIMO transmission, amplifying sections 202 and transmitting/receiving sections 203, a baseband signal processing section 204 and an application section 205.

Each amplifying section 202 amplifies radio frequency signals received at a plurality of transmission/reception antennas 201. Each transmitting/receiving section 203 receives a DL signal amplified by each amplifying section 202. Each transmitting/receiving section 203 performs frequency conversion on the received signal into a baseband signal to output to the baseband signal processing section 204.

The baseband signal processing section 204 performs at least one of FFT processing, error correcting decoding, and reception processing of retransmission control on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., processing of HARQ), channel coding, rate matching, puncturing, Discrete Fourier Transform (DFT) processing and IFFT processing on the UL data to transfer to each transmitting/receiving section 203. The baseband signal processing section 204 performs at least one of channel coding, rate matching, puncturing, DFT processing and IFFT processing on the UCI (e.g., at least one of A/N of the DL signal, Channel State Information (CSI) and a Scheduling Request (SR)), too, to transfer to each transmitting/receiving section 203.

Each transmitting/receiving section 203 converts the baseband signal output from the baseband signal processing section 204 into a radio frequency band to transmit. The radio frequency signal subjected to the frequency conversion by each transmitting/receiving section 203 is amplified by each amplifying section 202, and is transmitted from each transmission/reception antenna 201.

Furthermore, each transmitting/receiving section 203 receives a DL signal (e.g., at least one of DCI (a DL assignment and/or a UL grant), DL data and a DL reference signal), and transmits a UL signal (e.g., at least one of UL data, UCI and a UL reference signal).

Furthermore, each transmitting/receiving section 203 transmits a UL signal (e.g., at least one of a long PUSCH, a short PUSCH, a long PUCCH, a short PUCCH and an SRS) at a plurality of TTIs (e.g., long TTIs (first TTIs) and short TTIs (second TTIs)) of different time durations.

Furthermore, each transmitting/receiving section 203 receives a parameter used to control transmission power of the above UL signal. For example, each transmitting/receiving section 203 may receive the parameter for open loop control by higher layer signaling. Furthermore, each transmitting/receiving section 203 may receive DCI including a TPC command.

The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and receiving sections.

Figure 11:
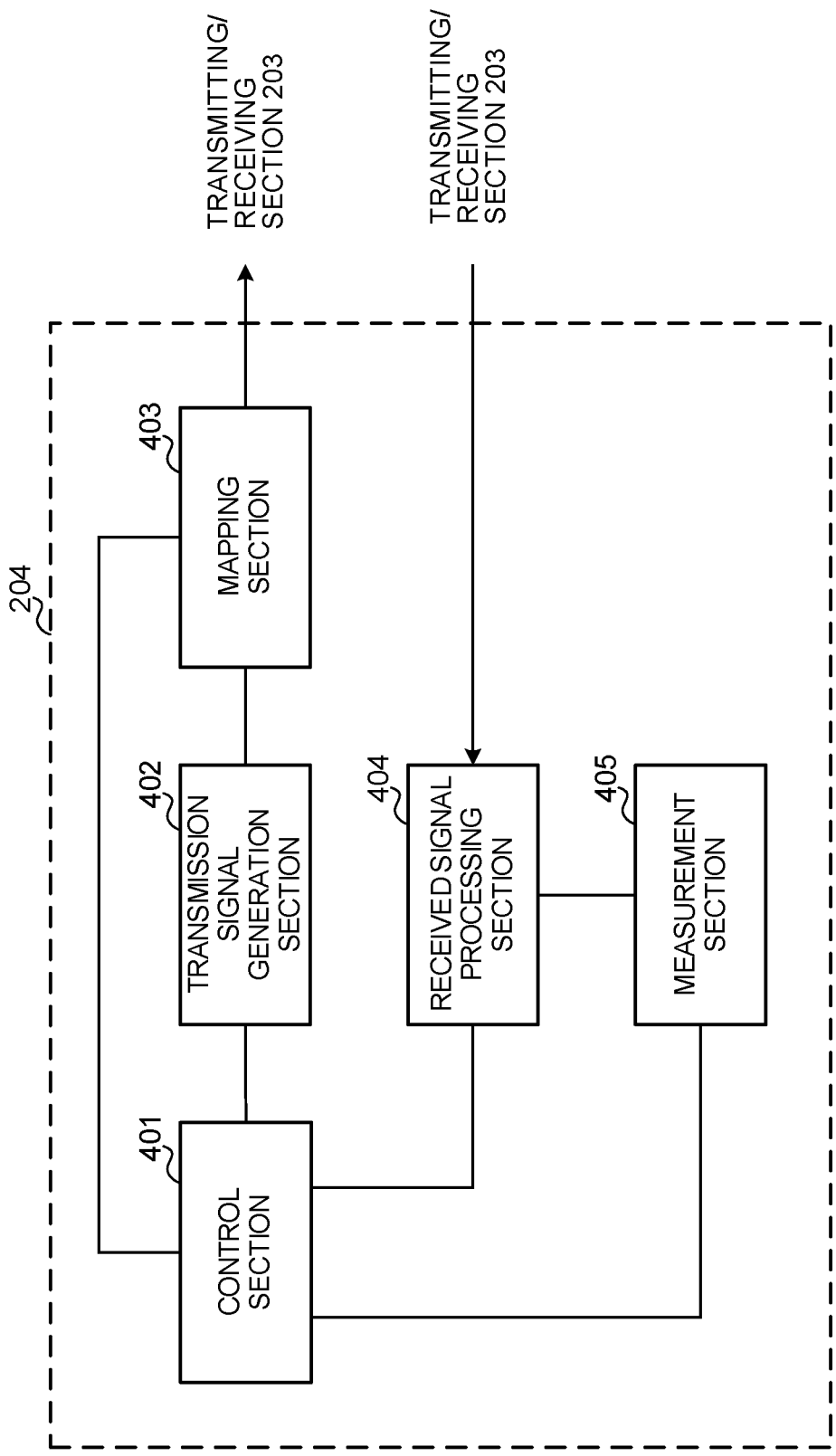
FIG. 11 is a diagram illustrating one example of a function configuration of the user terminal according to the present embodiment.

FIG. 11 is a diagram illustrating one example of a function configuration of the user terminal according to the present embodiment. In addition, FIG. 11 mainly illustrates function blocks of characteristic portions according to the present embodiment, and assumes that the user terminal 20 includes other function blocks that are necessary for radio communication, too. As illustrated in FIG. 11, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404 and measurement of the measurement section 405.

Furthermore, the control section 401 controls Transmission Time Intervals (TTI) used to receive a DL signal and/or transmit a UL signal. The control section 401 controls switching between a plurality of TTIs (e.g., long TTIs and short TTIs) of different time durations. The control section 401 may instruct switching between a plurality of TTIs by instruction information from the radio base station 10 by way of higher layer signaling and/or L1/L2 signaling.

Furthermore, the control section 401 controls transmission power of the UL signal. More specifically, the control section 401 may control transmission power of the UL signals at a plurality of TTIs of different time durations based on a parameter for open loop control and/or a parameter for closed loop control.

For example, the control section 401 may control transmission power of a long PUSCH and/or a short PUSCH based on at least one of the maximum transmission power ($P_{MAX}(i)$) of the user terminal, the bandwidth (the number of resource blocks) ($M_{PUSCH}(i)$) of the long PUSCH allocated to the user terminal at the long TTI #i, the transmission power offset P0 ($P_{0\_PUSCH}$), the weight coefficient ($\alpha$) based on the path loss, the Path Loss (PL), the offset ($\Delta_{TF,\,c}(i)$) based on the MCS and the TPC command (f(i)). In addition, at least one of these parameters may be common between the long PUSCH and the short PUSCH or may be independently configured.

Furthermore, the control section 401 may control activation or de-activation of accumulation of TPC commands of UL signals (e.g., the long PUSCH and the short PUSCH) at a plurality of TTIs of different time durations based on the instruction from the radio base station 10.

Furthermore, the control section 401 controls accumulation of TPC commands for the UL signals (e.g., the long PUSCH and the short PUSCH) at a plurality of TTIs of different time durations. More specifically, the control section 401 may control accumulation of TPC commands for the long PUSCH (first UL signal) and TPC commands for the short PUSCH (second UL signal).

Furthermore, the control section 401 may commonly accumulate or independently accumulate TPC commands for the long PUSCH (first UL signal) and TPC commands for the short PUSCH (second UL signal) (the case 1 according to the first embodiment).

Furthermore, the control section 401 may accumulate one of the TPC commands for the long PUSCH (first UL signal) and the TPC commands for the short PUSCH (second UL signal) (the case 2 or the case 3 according to the fist embodiment).

More specifically, when switching between long TTIs and short TTIs, the control section 401 may accumulate the TPC commands for the long PUSCH (first UL signal) based on the TPC commands for the short PUSCH (second UL signal) (case 2).

Alternatively, when switching between the long TTIs and the short TTIs, the control section 401 may accumulate TPC commands for the short PUSCH (second UL signal) based on the TPC commands for the long PUSCH (first UL signal) (case 3).

Furthermore, the control section 401 may not accumulate both of the TPC commands for the long PUSCH (first UL signal) and the TPC commands for the short PUSCH (second UL signal) (the case 4 according to the first embodiment).

Furthermore, the control section 401 may control resetting of accumulation of the TPC commands for the long PUSCH (first UL signal) and/or the TPC commands for the short PUSCH (second UL signal) (second embodiment).

The control section 401 can be composed of a controller, a control circuit or a control apparatus described based on the common knowledge in the technical field according to the present invention.

The transmission signal generating section 402 generates (e.g., encodes, rate-matches, punctures or modulates) a UL signal (including a UL data signal, a UL control signal, a UL reference signal and UCI) based on an instruction from the control section 401 to output to the mapping section 403. The transmission signal generating section 402 can be composed of a signal generator, a signal generating circuit and a signal generating apparatus described based on the common knowledge in the technical field according to the present invention.

The mapping section 403 maps the UL signal generated by the transmission signal generating section 402, on a radio resource based on the instruction from the control section 401 to output to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal and a DL reference signal).

The received signal processing section 404 outputs information received from the radio base station 10 to the control section 401. The received signal processing section 404 outputs, for example, broadcast information, system information, higher layer control information of higher layer signaling such as RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection or radio connection).

Figure 12:
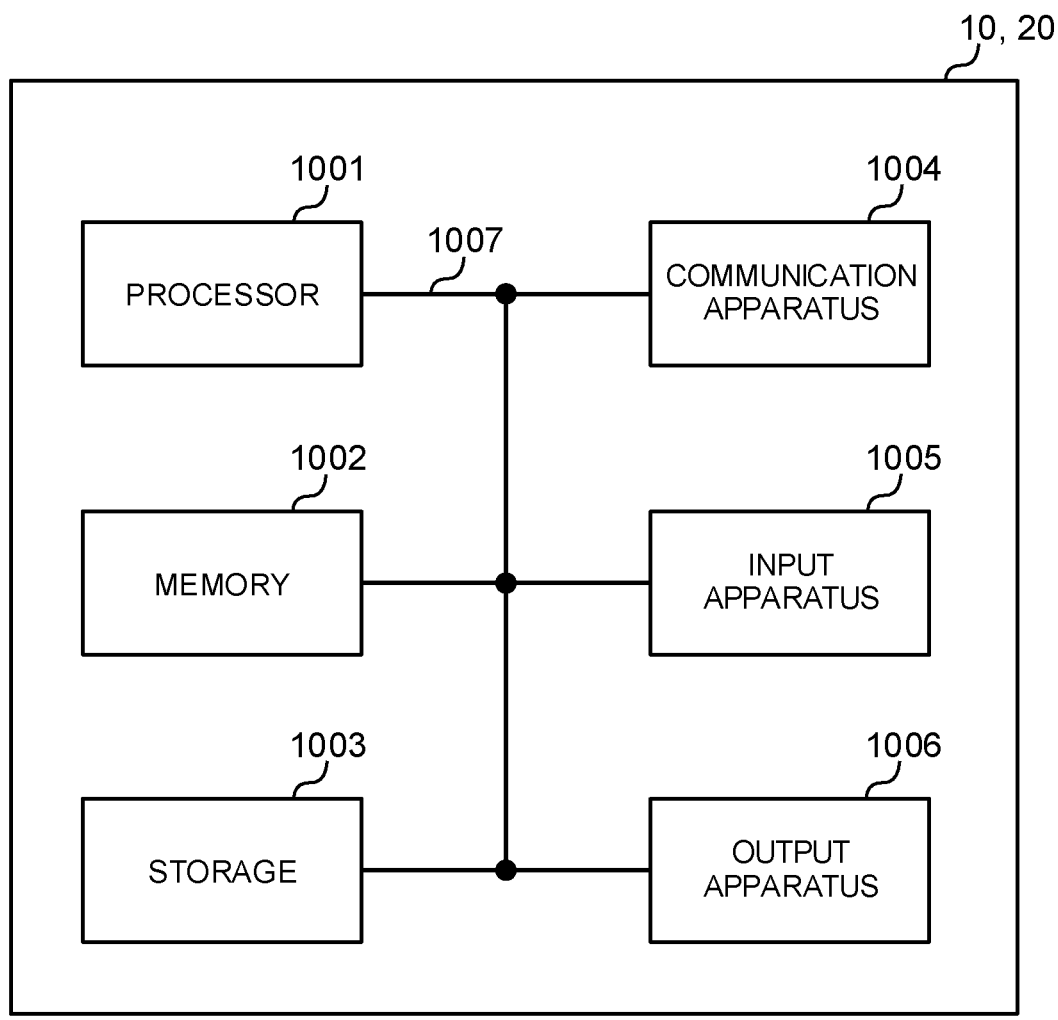
FIG. 12 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 12 is a diagram illustrating one example of hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an arithmetic operation, and control at least one of communication of the communication apparatus 1004 and reading and writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to the programs, the software module or the data. As the programs, programs that cause the computer to execute at least part of the operations described in the above embodiments are used. For example, the control section 401 of the user terminal 20 may be realized by a control program stored in the memory 1002 and operating on the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus illustrated in FIG. 12 is connected by the bus 1007 that communicates information.

The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., 1 ms) that does not depend on the numerology.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a subslot.

All of the radio frame, the subframe, the slot, the mini slot and the symbol indicate time units for transmitting signals. The other corresponding names of the radio frame, the subframe, the slot, the mini slot and the symbol may be used. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (1 ms) according to existing LTE, may be a period (e.g., 1 to 13 symbols) shorter than 1 ms or may be a period longer than 1 ms.

In this regard, the TTI refers to, for example, a minimum time unit of scheduling for radio communication. For example, in the LTE system, the radio base station performs scheduling for allocating radio resources (a frequency bandwidth and/or transmission power that can be used by each user terminal) in TTI units to each user terminal. In this regard, a definition of the TTI is not limited to this. The TTI may be a transmission time unit of a data packet (transport block) subjected to channel coding, or may be a processing unit of scheduling and/or link adaptation. In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe or a short subframe.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be composed of one or a plurality of resource blocks. In this regard, the RB may be referred to as a Physical Resource Block (PRB: Physical RB), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols included in a slot or a mini slot, the number of subcarriers included in an RB, the number of symbols in a TTI, a symbol length and a Cyclic Prefix (CP) length can be variously changed.

Furthermore, the information and the parameters described in this description may be expressed by absolute values, may be expressed by relative values with respect to predetermined values or may be expressed by other corresponding information. For example, a radio resource may be indicated by a predetermined index. Furthermore, numerical expressions used for these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspect/embodiment described in this description, and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRC Connection Setup message or an RRC Connection Reconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Furthermore, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB" "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and/or "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations or one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A),LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements.

Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
a receiver that receives downlink control information including a transmission power control (TPC) command;
a transmitter that transmits an uplink signal using a transmission power that is controlled based on an accumulated value of the TPC command, accumulated independently of a length of a transmission duration of the uplink signal; and
a processor that resets the accumulated value if a weight coefficient for pathloss is provided by higher layer signaling.

2. The terminal according to claim 1, wherein the weight coefficient for pathloss is independent of the length of the transmission duration.

3. The terminal according to claim 2, wherein the uplink signal is an uplink shared channel, an uplink control channel, or a sounding reference signal.

4. The terminal according to claim 1, wherein the uplink signal is an uplink shared channel, an uplink control channel, or a sounding reference signal.

5. A radio base station comprising:
a transmitter that transmits downlink control information including a transmission power control (TPC) command; and
a receiver that receives an uplink signal using a transmission power that is controlled based on an accumulated value of the TPC command accumulated independently of a transmission duration of the uplink signal,
wherein the accumulated value is reset if a weight coefficient for pathloss is provided by higher layer signaling.

6. A radio communication method for a terminal comprising:
receiving downlink control information including a transmission power control (TPC) command;
transmitting an uplink signal using a transmission power that is controlled based on an accumulated value of the TPC command accumulated independently of a transmission duration of the uplink signal; and
resetting the accumulated value if a weight coefficient for pathloss is provided by higher layer signaling.

7. A system comprising:
a radio base station comprising:
a first transmitter that transmits downlink control information including a transmission power control (TPC) command; and
a first receiver that receives an uplink signal using a transmission power that is controlled based on an accumulated value of the TPC command accumulated independently of a transmission duration of the uplink signal; and
a terminal comprising:
a second receiver that receives the downlink control information including the TPC command;
a second transmitter that transmits the uplink signal using a transmission power that is controlled based on the accumulated value of the TPC command, accumulated independently of a length of a transmission duration of the uplink signal; and
a processor that resets the accumulated value if a weight coefficient for pathloss is provided by higher layer signaling.

* * * * *